(12) United States Patent
Moredock

(10) Patent No.: US 6,878,189 B2
(45) Date of Patent: Apr. 12, 2005

(54) AIR PRECLEANER AND METHOD FOR SEPARATING HEAVIER-THAN-AIR PARTICULATE DEBRIS FROM DEBRIS LADEN AIR

(76) Inventor: James G. Moredock, 12559 Lazy Meadow Dr. South, Jacksonville, FL (US) 32225

( * ) Notice: Subject to any disclaimer, the term of this patent is extended or adjusted under 35 U.S.C. 154(b) by 37 days.

(21) Appl. No.: 10/425,930

(22) Filed: Apr. 30, 2003

(65) Prior Publication Data

US 2004/0216611 A1 Nov. 4, 2004

(51) Int. Cl.⁷ .......................... B01D 45/14; B01D 45/16
(52) U.S. Cl. ............................. 95/270; 55/345; 55/406; 55/431; 55/439; 95/271
(58) Field of Search .......... 55/345, 406, 439, 55/431, 385.3, DIG. 28; 95/269–271

(56) References Cited

U.S. PATENT DOCUMENTS

| | | | |
|---|---|---|---|
| 3,137,553 A | 6/1964 | Billey | 55/431 |
| 3,419,892 A | 12/1968 | Wagner et al. | 60/30 |
| 3,884,658 A * | 5/1975 | Roach | 55/315 |
| 4,118,207 A * | 10/1978 | Wilhelm | 55/338 |
| 4,126,199 A | 11/1978 | Hansen et al. | 180/54 A |
| 4,242,115 A | 12/1980 | Harold et al. | 55/347 |
| 4,325,460 A | 4/1982 | Hoppenstedt | 181/259 |
| 4,580,657 A | 4/1986 | Schmeichel et al. | 181/255 |
| 5,090,976 A * | 2/1992 | Dyson | 55/337 |
| 5,401,285 A | 3/1995 | Gillingham et al. | 55/337 X |
| 5,575,826 A | 11/1996 | Gillingham et al. | 55/337 X |
| 5,656,050 A | 8/1997 | Moredock | 55/394 |
| 5,683,479 A | 11/1997 | Gillingham et al. | 55/431 |
| 5,766,315 A | 6/1998 | Moredock | 95/270 |
| 6,319,304 B1 | 11/2001 | Moredock | 95/269 |
| 6,338,745 B1 | 1/2002 | Moredock et al. | 55/394 |
| 6,406,506 B1 | 6/2002 | Moredock et al. | 55/337 |
| 6,425,943 B1 | 7/2002 | Moredock | 95/269 |
| 6,451,080 B1 | 9/2002 | Rocklitz et al. | 55/404 |

OTHER PUBLICATIONS

Donald Company, Inc.; "Its Clear . . . The Donaldson TopSpin™ Pre–Cleaner Can Maximize Your Intake System"; 3/03; pp. 1–4.

* cited by examiner

Primary Examiner—Richard L. Chiesa
(74) Attorney, Agent, or Firm—Antonelli, Terry, Stout & Kraus, LLP

(57) ABSTRACT

A method and an air precleaner for separating heavier-than-air particulate debris from debris laden air to provide a clean airflow are disclosed. A flow path extends through the precleaner from an inlet to an outlet. Debris laden air is drawn into the inlet by a vacuum in communication with the outlet of the precleaner. A vortex flow of the debris laden air is formed in the flow path and flows through a first stage, ejective based precleaner and a second stage, scavenger based precleaner. Each stage centrifugally separates and removes particles of debris from the vortex flow. Efficient operation under extreme conditions with significant improvement in air filter life, is made possible by the air precleaner and method.

20 Claims, 2 Drawing Sheets

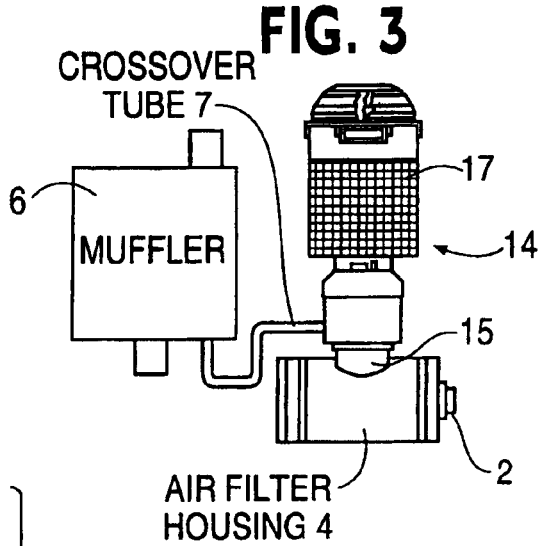
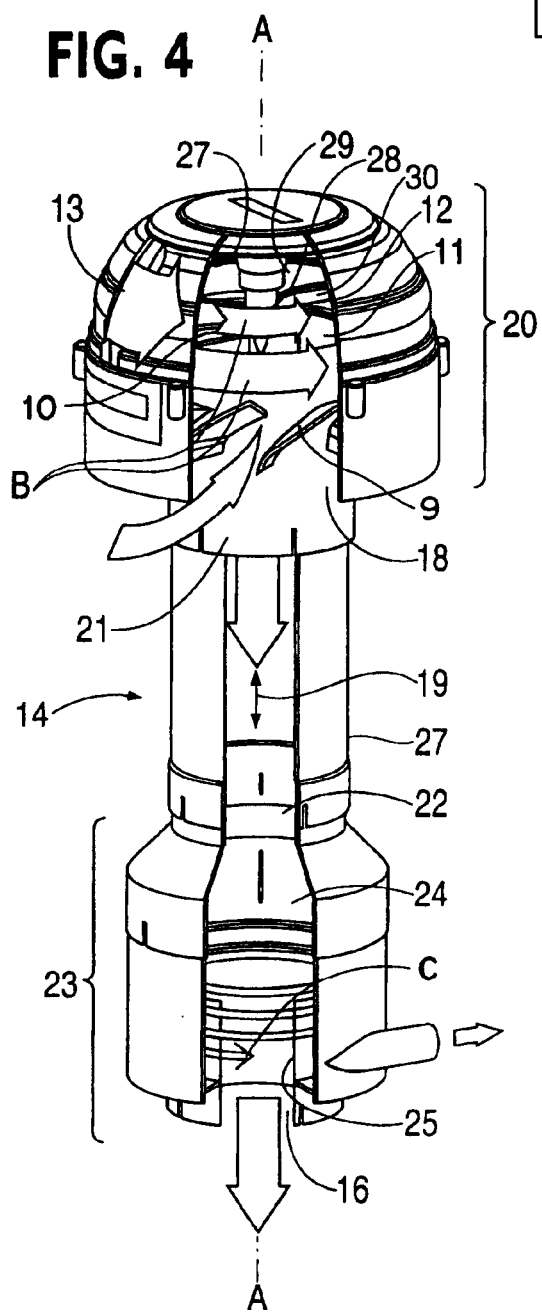
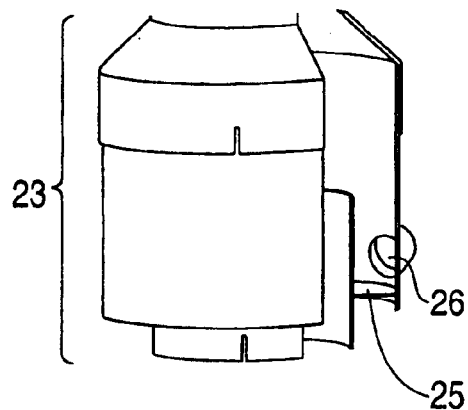

AIR PRECLEANER AND METHOD FOR SEPARATING HEAVIER-THAN-AIR PARTICULATE DEBRIS FROM DEBRIS LADEN AIR

TECHNICAL FIELD

The present invention relates to an improved air precleaner and method for separating heavier-than-air particulate debris from debris laden air which is drawn through the air precleaner for use in apparatus such as an internal combustion engine, a ventilation system, a cooling fan, or an air compressor.

BACKGROUND AND SUMMARY OF THE INVENTION

Air precleaners that separate heavier-than-air particles from the air used in combustion type engines are known. One example of a prior art air precleaner, a scavenger based system for a combustion type engine is shown in FIG. 1 wherein air precleaner 1 for combustion type engine 2 comprises an air inlet 3 through which debris-laden-air is drawn from the atmosphere by a vacuum. The vacuum is applied by the intake of the engine which is connected to the outlet of the air precleaner through an air filter housing 4. The air inlet contains fixed vanes for rotating the debris-laden-air drawn into the air precleaner to centrifugally separate debris which is collected in a dust ejector body 5 in a catch tray. A vacuum from the exhaust gas flow from the engine in muffler 6 is used to scavenge the collected debris from the catch tray in the ejector body via a crossover tube 7 connected to a scavenger port in ejector body adjacent the catch tray.

The needs of current combustion engine designs for extremely low initial restriction and high particle separating efficiency over the broad airflow range with which they are used was addressed by the invention of the air precleaner, 8 in FIG. 2, of assignee's U.S. Pat. Nos. 5,656,050 and 5,766,315, the disclosures of which are hereby incorporated by reference. As depicted in FIG. 2, the air precleaner 8 is an ejective based system in which debris laden air enters, see arrow A, through recessed vanes 9 in the bottom of the precleaner. A curved particle accelerator 10 in a separator chamber 11 of the precleaner rotates much faster than the incoming air. Debris is captured and passed down the length of the particle accelerator's straked appendages. Debris is then deposited on an inner wall 12 of the separator chamber. The particle accelerator spins deposited debris toward an ejection duct 13 in the separator chamber where it is ejected from the vortex, e.g. rotating flow in the separator chamber. Clean air continues to spin upwardly until it is redirected and compressed into an air outlet opening in the center of the bottom of the precleaner.

The air precleaner of FIG. 2 offers improved performance compared with that in FIG. 1. However, it has been found that in extreme conditions, such as found in many landfill and transfer station operations, the known precleaners may fail to provide satisfactory performance. The present invention solves this problem by combining the benefits of both ejective and scavenger based systems to achieve outstanding performance and substantial improvement in air filter life when operating under these extreme conditions.

An air precleaner of the invention for separating heavier-than-air particulate debris from debris laden air to provide a clean airflow, comprises:

a flow path extending through the precleaner from inlet to an outlet;

airflow management structure positioned to direct debris laden air drawn into the precleaner into a vortex flow in the flow path;

a first stage, ejective based precleaner in the flow path to centrifugally separate and remove particles of debris from the vortex path, the first stage precleaner including a particle accelerator rotatably mounted in the first stage precleaner to increase the rotational velocity of the vortex flow and encourage removal of debris therefrom; and a second stage, scavenger based precleaner in the flow path downstream from the first stage precleaner to centrifugally separate and remove from the vortex flow particles of debris remaining in the vortex flow. This dual stage air precleaner of the invention has been found to increase air filter life under extreme conditions ten times as compared with the use of single stage air precleaners.

A method of separating heavier-than-air particulate debris from debris laden air to provide a clean air flow according to the invention comprises:

drawing debris laden air into an inlet of an air cleaning system by application of a vacuum to an outlet of the air cleaning system which is in communication with the inlet by way of a flow path extending through the system;

directing debris laden air drawn into the inlet of the air cleaning system into a vortex flow in the flow path;

centrifugally separating and removing particles of debris from the vortex flow in a separator chamber of a first stage, ejective based precleaner of the system, wherein the centrifugal separating and removing is facilitated by transferring energy from the vortex flow in the flow path downstream of the separator chamber of the first stage precleaner to increase the rotational velocity of the vortex flow in the separator chamber of the first stage precleaner; and centrifugally separating and removing remaining particles of debris from the vortex flow at a second stage, scavenger based precleaner in the flow path downstream of the first stage precleaner.

These and other objects, features and advantages of the present invention will become more apparent from the following description of an example embodiment in accordance with the invention when taken in connection with the accompanying drawings.

BRIEF DESCRIPTION OF DRAWINGS

FIG. 3 is a schematic illustration of an example embodiment of an air precleaner system of the present invention for supplying clean air to an internal combustion engine.

FIG. 4 is a side view of the air precleaner of the system of FIG. 3, partially cut away to show the interior construction thereof.

FIG. 5 is a side view, from the left side, of the lower end of the precleaner in FIG. 4, showing the catch tray and scavenger port of the air precleaner.

DETAILED DESCRIPTION

Figure 1:
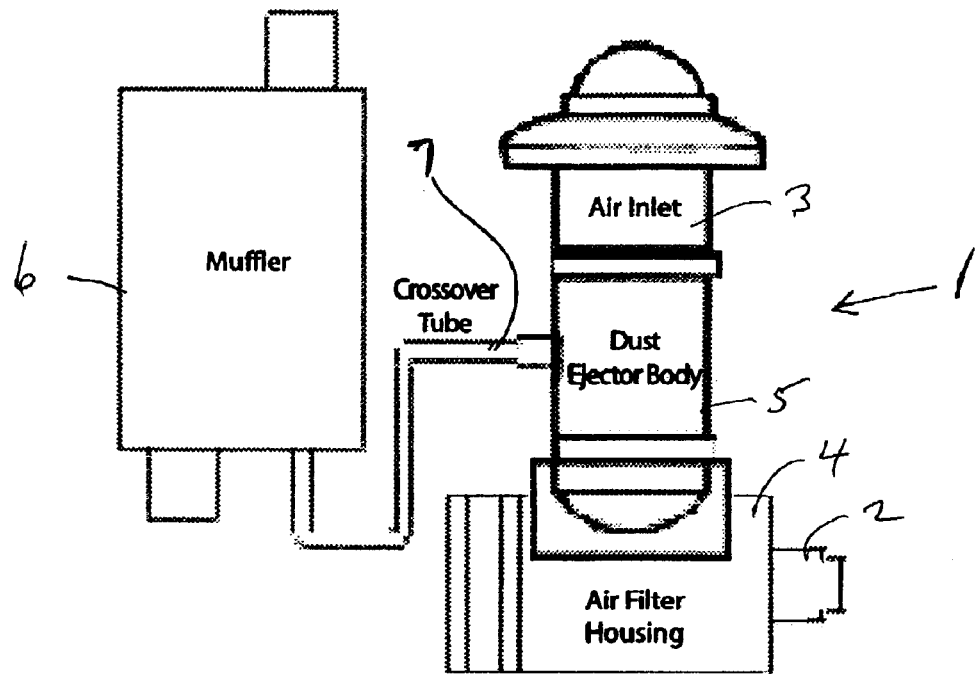
FIG. 1 is a schematic illustration of a conventional, scavenger based air precleaner system for an internal combustion engine.

Referring now to the drawings, an air precleaner 14 according to an example embodiment of the invention is shown in FIGS. 3–5. The air precleaner is shown in use on the air intake of an internal combustion engine 2 having an air filter housing 4 on its air intake. An inlet 15 of the air filter housing is connected to a clean air outlet 16 of the air precleaner at the lower end thereof as depicted in FIG. 3. A large prescreen 17, shown in FIG. 3 but not FIG. 4, is located about an inlet 18 of the air precleaner. The prescreen removes the largest contaminants from debris laden air being drawn to the inlet by a vacuum communicated from the engine intake through a flow path 19 extending through the precleaner from the inlet to the outlet. An airflow management structure including fixed vanes 9, is positioned to direct debris laden air drawn into the precleaner through the inlet into a vortex flow in the flow path shown by the arrows at B in FIG. 4.

Figure 2:
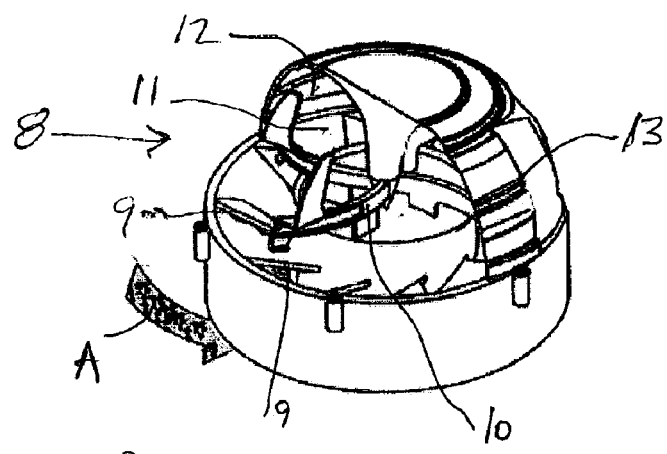
FIG. 2 is a perspective from one side of and slightly above an ejective based air precleaner, shown partially cut away, of known construction for providing a supply of clean air to an apparatus such as internal combustion engine.

The air precleaner comprises a first stage, ejective based precleaner 20 in the flow path to centrifugally separate and remove particles of debris from debris laden air drawn into the precleaner. This first stage precleaner is preferably constructed in accordance with the single stage, ejective based air precleaner of FIG. 2. That is, precleaner 20 has a particle accelerator 10 rotatably mounted in a separator chamber 11 to increase the rotational velocity of the vortex airflow entering the separator chamber and to encourage removal of debris therefrom. An outlet 21 of the first stage precleaner is connected by a straight, cylindrical tube 27 forming a portion of the flow path from the outlet of the first stage precleaner to the inlet 22 of a second stage, scavenger-based precleaner 23 of the air precleaner 14.

The second stage precelaner 23 is arranged in the flow path downstream from the first stage precleaner to centrifugally separate and remove from the vortex airflow therein, shown by arrow C in FIG. 4, particles of debris remaining in the vortex flow after passage through the first stage precleaner. In extreme conditions, such as found in many landfill and transfer station operations, this combination of two precleaner stages, the first ejective based and the second scavenger based, arranged serially is effective to increase the average air filter life ten fold. The combination of the two precleaner stages, in the sequence shown has been found to be so effective in extreme conditions because it removes relatively larger debris in the first stage precleaner, leaving relatively smaller debris in the vortex flow which is effectively removed in the second stage, scavenger based precleaner. The relatively high speed vortex flow coming from the outlet 21 of the first stage precleaner directly into the second stage precleaner is thought to contribute to this effectiveness since separation is accomplished in each stage by centrifugal force acting on the heavier-than-air debris.

The enlarged diameter of separator chamber 24 of the second stage precleaner includes a catch tray 25, FIGS. 4 and 5, at the lower end thereof for collecting centrifugally separated debris from the vortex flow moving therethrough. A scavenger port 26, FIG. 5, in the side wall of the chamber 24 adjacent the catch tray permits collected debris to be pulled from the catch tray by a vacuum applied to the port via a crossover tube 7, FIG. 3. The exhaust gas flow from the internal combustion engine being supplied clean air by the air precleaner 14 is used to develop a vacuum in muffler 6 that is used for such extracting of the relatively smaller, remaining debris collected in the catch tray of the second stage precleaner.

Features in the first stage precleaner which contribute to the highly effective performance of the dual stage air precleaner of the invention under extreme conditions include a toroidal dome 27 which forms the upper end of the first stage precleaner circular separator chamber 11. The toroidal dome smoothes airflow transition of the vortex flow moving through the circular separator chamber in a cyclonic pattern past the ejection duct 13 toward the toroidal dome where it is folded over by the toroidal dome for whirlpooling back in a direction, down in FIG. 4, away from the toroidal dome and inwardly of and through the oppositely moving incoming vortex flow. Also, the particle accelerator 10 includes a central hub 28 having an outer configuration which forms a smooth transition from an arch 29 of the toroidal dome to an outer end of the central hub. The inner wall 12 of the separator chamber 11, as seen in a cross section thereof taken along a longitudinal axis A—A, FIG. 4, of the air precleaner slopes inwardly in the direction of the toroidal dome to decrease the cross sectional area for the vortex flow moving through the separator chamber.

The shape of the separator chamber 11 in the first stage precleaner preferably provides a linear reduction in cross sectional area of the flow path for the vortex airflow moving through the separator chamber of the first stage precleaner. This serves to increase the velocity of the vortex flow in the separator chamber 11, and, in turn, downstream, in the separator chamber 24 of the second stage precleaner, and it keeps debris in the air circulating around the inner wall of the separator chambers for ejection through the ejection duct 13 and for collection of remaining debris in the catch tray 25 in the respective stages.

The particle accelerator 10 in the first stage precleaner includes, in addition to the central hub 28, a plurality of curved appendages 30 that arc back from the central hub in a swept back attitude relative to the direction of the vortex airflow, B in FIG. 4, to impart an outward velocity vector to the air and debris. The curved area of the appendages extend downward into a passageway of the air outlet 21 of the first stage precleaner. The curved area is cupped in the direction of the airflow vortex in the air outlet passage for rotationally powering the particle accelerator at a speed greater than the rotational speed of the upwardly moving vortex airflow entering the separator chamber 11 in the first stage precleaner. In this way energy is transferred from the vortex flow in the flow path downstream of the separator chamber in the first stage precleaner to increase the rotational velocity of the vortex flow in the separator chamber.

While we have illustrated only a single example embodiment of the invention, as will be understood by the skilled artisan the invention is not confined to the particular construction and specific arrangement of parts herein illustrated and described. For example, the vacuum source for scavenging can not only be a venturi created by an exhaust gas muffler; but instead could be a venturi created by airflow from a radiator cooling fan, or from an electrical or hydraulic driven impeller. Thus, the present invention includes these and other modified forms thereof as come within the scope of the following claims.

I claim:

1. An air precleaner for separating heavier-than-air particulate debris from debris laden air to provide a clean air flow, the precleaner comprising:

a flow path extending through the precleaner from an inlet to an outlet;

airflow management structure positioned to direct debris laden air drawn into the precleaner inlet into a vortex flow in the flow path in response to the application of a vacuum to the outlet which is communicated through the flow path to the inlet;

a first stage precleaner in the flow path to centrifugally separate and remove particles of debris from the vortex flow and the flow path, the first stage precleaner including a particle accelerator rotatably mounted in the first stage precleaner and rotatably driven by the vortex flow in the flow path to increase the rotational velocity of the vortex flow and encourage removal of debris therefrom; and a second stage precleaner in the flow path downstream from the first stage precleaner to receive the vortex flow from the first stage precleaner and to centrifugally separate and remove from the vortex flow and the flow path particles of debris remaining in the vortex flow.

2. The air precleaner according to claim 1, wherein the second stage precleaner includes a catch tray for collecting centrifugally separated debris from the vortex flow, the catch tray being located in a separator chamber for the vortex flow in the second stage precleaner.

3. The air precleaner according to claim 2, further comprising a scavenger port in the catch tray through which collected debris in the catch tray can be exhausted.

4. The air precleaner according to claim 3, further comprising a vacuum source connected to the scavenger port.

5. The air precleaner according to claim 4, wherein the vacuum source employs exhaust gas flow from an internal combustion engine to develop a vacuum to scavenge collected debris.

6. The air precleaner according to claim 1, further comprising a prescreen that removes large debris from debris laden air entering the precleaner.

7. The air precleaner according to claim 1, wherein the airflow management structure includes a plurality of vanes.

8. The air precleaner according to claim 1, wherein the first stage precleaner further includes a circular separator chamber having an inner wall with an ejection duct therein to remove centrifugally separated debris and air from the vortex flow moving through the separator chamber.

9. The air precleaner according to claim 8, wherein an end of the circular separator chamber has a toroidal dome for smooth airflow transition of the vortex flow moving through the circular separator chamber in a cyclonic pattern past the ejection duct toward the toroidal dome where it is folded over by the toroidal dome for whirlpooling back in a direction away from the toroidal dome inwardly of and through the vortex flow moving toward the toroidal dome.

10. The air precleaner according to claim 9, wherein the particle accelerator includes a central hub having an outer configuration which forms a smooth transition from an arch of the toroidal dome to an outer end of the central hub.

11. The air precleaner according to claim 9, wherein the inner wall of the separator chamber, as seen in a cross section thereof taken along a longitudinal axis of the air precleaner slopes inwardly in the direction of the toroidal dome to decrease the cross sectional area of the vortex flow moving through the separator chamber.

12. The air precleaner according to claim 11, wherein the shape of the separator chamber provides a linear reduction in cross sectional area of the flow path for the vortex flow moving through the separator chamber thereby increasing the velocity of the vortex flow in the separator chamber and keeping debris and the air circulating around the inner wall of the separator chamber for ejection through the ejection duct.

13. The air precleaner according to claim 1, wherein the particle accelerator includes a central hub and a plurality of curved appendages that are arc back from the central hub in a swept back attitude relative to the direction of the vortex flow.

14. The air precleaner according to claim 13, wherein a curved area of the appendages extends into a passageway which forms a portion of the flow path downstream of the separator chamber, the curved area being cupped in the direction of the airflow vortex in the passageway for rotationally powering the particle accelerator at a speed greater than the rotational speed of the vortex flow upstream of the particle accelerator.

15. An air precleaner system for separating heavier-than-air particulate debris from debris laden air to provide a clean airflow to the intake of an internal combustion engine, the system comprising:

a flow path extending through the precleaner system from an inlet to an outlet in communication with the intake of an internal combustion engine;

airflow management structure positioned to direct debris laden air drawn into the precleaner through the inlet into a vortex flow in the flow path in response to the application of a vacuum to the outlet by the engine intake, which vacuum is communicated through the flow path to the inlet;

a first stage precleaner in the flow path to centrifugally separate and remove particles of debris from the vortex flow and the flow path, the first stage precleaner including a particle accelerator rotatably mounted in the first stage precleaner and rotatably driven by the vortex flow in the flow path to increase the rotational velocity of the vortex flow and encourage removal of debris therefrom; and a second stage precleaner in the flow path downstream from the first stage precleaner to receive the vortex flow from the first stage precleaner and to centrifugally separate and remove from the vortex flow particles of debris remaining in the vortex flow, wherein the second stage precleaner includes a catch tray for collecting centrifugally separated debris from the vortex flow, a scavenger port in the catch tray through which collected debris in the catch tray can be exhausted, and a vacuum source connected to the scavenger port, the vacuum source employing exhaust gas flow from the internal combustion engine to develop a vacuum to scavenge collected debris.

16. A method of separating heavier-than-air particulate debris from debris laden air to provide a clean air flow, the method comprising:

drawing debris laden air into an inlet of an air cleaning system by application of a vacuum to an outlet of the air cleaning system which is in communication with the inlet by way of a flow path extending through the system between the inlet and the outlet;

directing debris laden air drawn into the inlet of the air cleaning system into a vortex flow in the flow path;

centrifugally separating and removing particles of debris from the vortex flow and the flow path in a separator chamber of a first stage precleaner of the system, wherein the centrifugal separating and removing is facilitated by transferring energy from the vortex flow in the flow path downstream of the separator chamber to increase the rotational velocity of the vortex flow in the separator chamber;

directing the vortex flow in the flow path downstream of the first stage precleaner through a second stage precleaner to centrifugally separate and remove remaining particles of debris from the vortex flow in the flow path.

17. The method according to claim 16, including collecting the particles of debris separated and removed at the second stage precleaner and scavenging the collected debris from the air cleaning system by means of a vacuum developed from the exhaust gas flow of an internal combustion engine.

18. An air precleaner for separating heavier-than-air particulate debris from debris laden air to provide a clean air flow, the precleaner comprising:
   a flow path extending through the precleaner from an inlet to an outlet;
   airflow management structure positioned to direct debris laden air drawn into the precleaner into a vortex flow in the flow path in response to the application of a vacuum to the outlet which is communicated through the flow path to the inlet;
   an ejective based precleaner stage in the flow path to centrifugally separate and remove particles of debris from the vortex flow and eject the debris from the air precleaner;
   a scavenger based precleaner stage in the flow path downstream from the ejective based precleaner stage to receive the vortex flow from the ejective based precleaner stage and to centrifugally separate and remove from the vortex flow particles of debris remaining in the vortex flow.

19. The air precleaner according to claim 18, wherein the scavenger based precleaner stage includes a catch tray for collecting centrifugally separated debris from the vortex flow and a scavenger port through which collected debris in the catch tray can be exhausted.

20. The air precleaner according to claim 19, further comprising a vacuum source connected to the scavenger port, the vacuum source developing a vacuum employing exhaust gas flow from an internal combustion engine to scavenge debris collected in the catch tray.

* * * * *